United States Patent Office 2,745,848
Patented May 15, 1956

2,745,848
PREPARATION OF CYCLOHEXENE OXIDE

Frank P. Greenspan and Ralph J. Gall, Buffalo, N. Y., assignors, by mesne assignments, to Food Machinery and Chemical Corporation, San Jose, Calif., a corporation of Delaware No Drawing. Application February 25, 1953,
Serial No. 338,878

2 Claims. (Cl. 260—348.5)

This invention pertains to a method of making cyclohexene oxide by epoxidation of cyclohexene by means of perpropionic acid.

Various methods of preparing cyclohexene oxide (1,2-epoxy-cyclohexene) have been described. One procedure involves preparation of 2-chlorocyclohexanol by first treating cyclohexene with hypochlorous acid and then treating the reaction product so produced with sodium hydroxide. This method involves a plurality of steps and reagents and gives poor yields of the end product, cyclohexene oxide.

A much simpler procedure of making cyclohexene oxide appears to consist in treating cyclohexene with a peracid. Cyclohexene oxide may be prepared by means of reaction with perbenzoic acid and this method has been described in the literature. It has not found commercial acceptance because perbenzoic acid is expensive, not commercially available, and has to be prepared on the spot immediately prior to its use in the reaction. Performic acid also unavailable commercially, is unsatisfactory as an epoxidizing agent for cyclohexene because the reaction leads preferentially to hydroxy-formoxy cyclohexane with small amounts and thus very low yields of the desired cyclohexene oxide. Peracetic acid, although commercially available, is equally unsatisfactory. Although conversion of the double bonds in the cyclohexene is almost quantitative, excessive ring opening takes place, thus reducing yields of the desired cyclohexene oxide to about 30%.

We have now found that the use of perpropionic acid, preferably in an inert solvent medium, permits preparation of cyclohexene oxide in a simple one-step procedure with yields as high as 90% or more.

In accordance with our invention, cyclohexene oxide may be made in excellent yield by treating cyclohexene in a solvent solution, such as a chloroform, with perpropionic acid, preferably in presence of a neutralizing agent to neutralize the effects of residual mineral acid catalyst, if such has been used in the preparation of the perpropionic acid.

The advantages of the process of our invention are, therefore, the use of stable, readily available perpropionic acid, the simplicity of the process, which involves only one reaction step and the high, nearly theoretical yields of product.

The following example will serve to illustrate the principle of our invention.

Example 1

246 grams of cyclohexene are dissolved in 600 ml. of chloroform contained in a vessel equipped with reflux condenser, stirrer, and thermometer. A mixture of 656 grams of 43.9% perpropionic acid solution (corresponding to a 4% excess over the stoichiometric amount required for this reaction) and 32.8 grams of anhydrous sodium acetate, as a buffering agent, are added with constant stirring to the contents of the vessel over a period of about two and one-half hours, while keeping the mixture at a temperature of about 5° to 20° C. The reaction is then continued for another 40 to 60 minutes or until samples taken from the reaction mixture indicate, upon testing, that substantially all of the perpropionic acid has reacted. The cyclohexene oxide is then obtained from the reaction mixture after adjusting the pH thereof to about 7 as by neutralizing with any suitable alkali, as for instance sodium hydroxide, separating the chloroform layer from the aqueous layer and isolating the cyclohexene oxide by fractionally distilling off the chloroform.

The cyclohexene oxide, identified by its boiling point of 126° to 132° C. was obtained in 93% yield.

Although the above example has been given, employing chloroform as the solvent medium, it will be understood that any inert organic solvent is suitable for the reaction, such as benzene, hexane, toluene, xylene, carbon tetrachloride, naphthas, and chlorinated solvents, ethylene dichloride, acetylene tetrachloride, ether, and the like.

What is claimed is:

1. The method of making cyclohexene oxide which comprises stirring cyclohexene with a minor excess of perpropionic acid at a temperature of 5° to 20° C. for a period of about 2 to 4 hours, adjusting the reaction mixture to a pH of substantially 7 and separating the cyclohexene oxide from the reaction mixture.

2. The method of making cyclohexene oxide which comprises stirring cyclohexene with a minor excess of perpropionic acid and sufficient sodium acetate to buffer the solution, for a period of about 2 to 4 hours at a temperature of 5° C. to 20° C., adjusting the pH of the reaction mixture to a pH of substantially 7 and separating the cyclohexene oxide from the reaction mixture.

References Cited in the file of this patent

UNITED STATES PATENTS 2,458,484    Terry _____ Jan. 4, 1949

OTHER REFERENCES

Swern: Chem. Reviews, vol. 45, Aug. 1949, pp. 8, 9 and 16–25.

Boeseken et al.: J. Prakt. Chemie 131: 285–8 (1931) cited in Chem. Abst. 25: 5403 (1931)